US008682609B2

(12) United States Patent
Heiland

(10) Patent No.: US 8,682,609 B2
(45) Date of Patent: Mar. 25, 2014

(54) ACTIVE VIBRATION ISOLATION SYSTEM

(75) Inventor: Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 771 days.

(21) Appl. No.: 12/879,472

(22) Filed: Sep. 10, 2010

(65) Prior Publication Data

US 2011/0062306 A1    Mar. 17, 2011

(30) Foreign Application Priority Data

Sep. 11, 2009   (EP) ..................................... 09011638

(51) Int. Cl.
*G01C 9/00*   (2006.01)

(52) U.S. Cl.
USPC ........... 702/150; 702/113; 702/115; 248/550; 248/638

(58) Field of Classification Search
USPC ............ 248/550, 668; 702/33, 150, 105, 113, 702/115
See application file for complete search history.

(56) References Cited

U.S. PATENT DOCUMENTS

| | | | |
|---|---|---|---|
| 6,036,162 A | 3/2000 | Hayashi | |
| 2001/0040324 A1 | 11/2001 | Mayama et al. | |

FOREIGN PATENT DOCUMENTS

EP    0814279 A1    12/1997

OTHER PUBLICATIONS

Endre Kovacs, "European Search Report for international application No. 09011638.5-1264", Apr. 7, 2010, Publisher: European Patent Office, Published in: EP.

*Primary Examiner* — Mischita Henson
(74) *Attorney, Agent, or Firm* — Kaplan Breyer Schwarz & Ottesen, LLP

(57) ABSTRACT

The present invention relates to a method for regulating an active vibration isolation system and to an active vibration isolation system, in particular for a vibration isolated positioning of lithography-devices, wafer-handling-systems and/or microscopes, as for instance scanning microscopes. The active vibration isolation system comprises the following components: a support body for bearing a load which is to be isolated; pneumatic vibration isolators with controllable valves for carrying the support body with respect to the ground; position sensors for providing vertical position signals of the support body; a first regulating system for vibration compensation in at least one degree of freedom in translation (Xt,Yt,Zt) and in at least one degree of freedom in rotation (Xr,Yr,Zr) and a second pneumatic regulating system for vibration compensation in at least one degree of freedom selected from three degrees of freedom (Zt,Xr,Yr) which are effective in vertical direction.

14 Claims, 5 Drawing Sheets

ACTIVE VIBRATION ISOLATION SYSTEM

CROSS-REFERENCE TO RELATED APPLICATIONS

European patent application EP 09 011 638.5, filed Sep. 11, 2009, is incorporated herein by reference.

FIELD OF THE INVENTION

The present invention relates to a method for regulating an active vibration isolation system and to an active vibration isolation system, in particular for a vibration isolated positioning of lithography-devices, wafer-handling-systems and/or microscopes, as for instance scanning microscopes.

BACKGROUND OF THE INVENTION

Vibration isolation systems are known and are required in several technique areas, as for instance in the area of semiconductor industry. For instance document DE 69817750 T2 shows a vibration isolation system which is particularly provided for a vibration isolated positioning of a lithography-device. It is shown a load which is positioned on air bearings to isolate the load from vibrations and/or oscillations. Typically the load comprises a table and components which are positioned on the table. One example of such a component represents a production line or parts of it. The table is also known as base element or support body or main plate.

A passive vibration isolation system is characterized by a "simple" bearing having a mechanical stiffness as low as possible. The transmission of external vibrations to the isolated load is reduced. An air bearing and a polymer-spring-element for bearing represent two examples for a passive vibration isolation system.

The passive vibration isolation systems are characterized by a kind of oscillation damping (or damping attenuation) or by a kind of "isolated" bearing of the load. In contrast to this an active vibration isolation is characterized by an active vibration compensation. A motion which is induced by an oscillation and/or vibration is compensated by a corresponding counter motion. For instance an acceleration vector which is induced by an oscillation of the load is counteracted by an acceleration vector having the same absolute value but acting in an opposite direction (or having an opposite algebraic sign respectively). The resulting entire or total acceleration of the load is equal to zero. The load rests or remains in a desired position.

Therefore, active vibration or oscillation isolation systems comprise, optionally together with a bearing of mechanical stiffness as low as possible, additionally a regulating (or controlling) system. The regulating system comprises a regulating (or controlling) device, sensors as well as actuators. The actuators specifically counteract vibrations entering the system. The sensors detect the motions of the carried load. The regulating device generates compensation signals. By means of the compensation signals the actors are controlled and corresponding compensation motions are generated. It is possible to apply digital or analog regulating techniques or both techniques together as well, the so called hybrid regulating (or controlling) technique.

In general four air bearings per system and in particular per load are applied. The air bearings are called as well as pneumatic isolators or vibration isolators. Each of the isolators "alone" is used for height adjustment only. The system is redundant. Therefore, only three of the four air bearings are equipped with particularly controllable (or adjustable) valves. Since one plane, in this case the horizontal plane, is defined unambiguously by three support points. The forth isolator is supplied passively by one valve selected from the three further valve (a so called "master-slave-configuration"). Accordingly, in each case only three of the four isolators are influenced by means of a controlling. The forth isolator remains passive.

The requirements for vibration isolation systems are increasing, in particular in semiconductor industry. For instance moving or travelling or movable mounted tables on the support body, so-called "stages", which are intended for the transportation of wafers are in operation. Due to their motion upon the support body, these stages induce vibrations in the system itself, so-called "intrinsic" vibrations. Therefore, it is necessary to compensate efficiently the vibrations induced by the motion of a stage. Since the stages own a quite high weight, increased demands are required to a system for vibration isolation or vibration compensation. In particular the "permanent" providing of the required force by the used actuators proves to be problematic.

SUMMARY OF THE INVENTION

The invention is based on the object to provide a system and a method for active vibration isolation which at least reduced the aforementioned disadvantages of the state of the art.

In particular it should be possible to implement (or integrate) the invention in already existing controlling concepts or to enlarge the known controlling concepts.

The inventive solution of the objects is achieved by an active vibration isolation system and a method for regulating (or controlling) an active vibration isolation system.

The invention proposes an active vibration isolation system comprising
a) a support body for bearing a load which is to be isolated,
b) preferably pneumatic vibration isolators with, preferably controllable (or adjustable) valves for carrying (or bearing or supporting) the support body with respect to a base,
c) position sensors for providing, preferably vertical, position signals of the support body,
d) a first regulating (or controlling) system for vibration compensation in at least one degree of freedom in translation $X_t$, $Y_t$ and $Z_t$ and in at least one degree of freedom in rotation $X_r$, $Y_r$ and $Z_r$ with at least
   d1) first sensors for providing first sensor signals which represent vibrations,
   d2) first actuators for vibration compensation which are controllable by feeding (or providing) first actuator actuation signals, and
   d3) a first regulating device which is intended (or embodied or constructed) to process the provided first sensor signals to form the first actuator actuation signals, and
e) a second, preferably pneumatic, regulating (or controlling) system for vibration compensation in at least one degree of freedom selected from three degrees of freedom $Z_r$, $X_r$ and $Y_r$ which are effective (or acting) in vertical direction with at least
   e1) the position sensors as second sensors for providing second sensor signals which represent vibrations,
   e2) the, preferably pneumatic, vibration isolators, preferably with the valves, as second actuators for vibration compensation which are controllable by feeding second actuator actuation signals, and
   e3) a second regulating device which is intended to process the provided position signals to form the second actuator actuation signals.

Preferably at least one branch (or connection or junction) from the first regulating system to the second pneumatic regulating system is provided such that the first regulating system and the second pneumatic regulating system are coupled to act together or to co-operate in at least one degree of freedom of the three degrees of freedom (Zt,Xr,Yr) which are effective or acting in vertical direction.

Generally, the first regulating system is coupled or connected with the second regulating system. In one embodiment means for combining or adding the first actuator actuation signals which are effective (or acting) in at least one degree of freedom of the three vertical degrees of freedom Zt, Xr and Yr with the second actuator actuation signals which are effective (or acting) in the corresponding degree of freedom are provided. In a preferred embodiment the means for combining are provided as a circuit. The circuit can be embodied as a digital and/or analog circuit.

The invention also proposes a method for regulating or controlling an active vibration isolation system which is equipped with a support body for bearing or supporting a load which is to be isolated. The method comprises the following steps:
- Detecting at least vibrations of the support body and/or a load which is to be isolated by means of a plurality of first sensors,
- Detecting, preferably vertical, positions of the support body by means of a plurality of position sensors as second sensors,
- Providing first sensor signals, which represent the detected vibrations, and second sensor signals, which represent the detected, preferably vertical, positions,
- Processing the provided first and second sensor signals to form first actuator actuation signals for controlling first actuators and to form second actuator actuation signals for controlling second actuators which are provided as, preferably pneumatic, vibration isolators which carry or support the support body with respect to a base
- Feeding the first and second actuator actuation signals to the first actuators and to the second actuators to counteract the vibrations.

Preferably the method according to the present invention is suitable for being carried out by the system according to the present invention. Preferably the system according to the present invention is suitable for carrying out the method according to the present invention.

Vibration compensation and/or active vibration isolation can be defined in such a way that any disturbing motions and/or oscillations and/or vibrations, which effect or influence the system, should be counteracted. Ideally said motions and/or oscillations and/or vibrations are or will be compensated. Preferably, the compensation and/or the active vibration isolation is performed in all six degrees of freedom of motion. The chosen term vibration should cover each kind of disturbing influence or motion, for instance an oscillation as well.

The six degrees of freedom are the three degrees of freedom in translation Xt, Yt and Zt and the three degrees of freedom in rotation Xr, Yr and Zr. The coordinates X and Y define the horizontal plane and the coordinate Z defines the vertical in the present configuration. Generally, the horizontal plane is defined or described by the support body.

The aforementioned vertically effective or acting degrees of freedom are:
- the degree of freedom in translation in vertical direction Zt, for instance to appoint a height change of the support body,
- the degree of freedom in rotation in horizontal direction Xr, for instance to appoint a tilting motion of the support body in or out of the horizontal plane and
- the degree of freedom in rotation in horizontal direction Yr, for instance to appoint a tilting motion of the support body in or out of the horizontal plane but perpendicular to Xr.

If there is no specific differentiation, so the subsequent description refers to the first and second regulating system, the first and second sensors, the first and second actuators, etc.

The sensors detect, indirectly or directly, a motion of the support body and/or the load. Preferably the motion is a vibration and/or oscillation. The motion is characterized by an acceleration, a velocity and/or a position change of the support body. For instance, the position of the support body is dependent on the oscillations and/or vibrations effecting the support body.

The sensor can be a sensor which is appropriate to detect the vibration or a disturbance in one degree of freedom only. The sensor can be a sensor which is appropriate to detect the vibration or a disturbance in a plurality degrees of freedom as well. Examples for sensors are geophon-sensors and/or piezo-electrical sensors. It is emphasized that these examples are exemplary only and not restricted to this enumeration.

The position sensors, in particular for detecting the vertical position and/or for providing the vertical position signals, provide information related to the position and/or a position change, preferably of the support body. The detection can be directly or indirectly. Preferably, the position, for instance the height, is directly detected. The position sensors, in particular for providing the vertical position signals, can exhibit further functions. For instance, additionally they are able to detect the acceleration and/or the velocity.

The sensor signals can be analog and/or digital signals. A sensor signal can be a signal, which provides the vibration or a disturbance in a single degree of freedom only. The sensor signal can be a signal, which provides the vibration or a disturbance in a plurality of degrees of freedom as well.

The actuator actuation signals can be analog and/or digital signals. An actuator actuation signal represents a kind of compensation signal. A vibration of a borne or supported load is actively compensated. The actuators can be effective or act in a single degree of freedom or in a plurality degrees of freedom. Accordingly, an actuator actuation signal can be a signal, which contains the information for a single degree of freedom only. However, an actuator actuation signal can be a signal as well, which contains the information for a plurality degrees of freedom. Examples for actuators are lorentz-motors, as for instance plungers (moving coils), and/or piezo-electrical actuators. It is emphasized that these examples are exemplary only and not restricted to this enumeration.

The actuators own an action range. The corresponding action range is exemplary defined by the magnitude or amplitude, the direction and/or the frequency of the actuator actuation signals. The pneumatic vibration isolators as second actuators own an effective force acting in the three vertically degrees of freedom Zt, Xr and Yr.

The regulating device can be a digitally and/or in analog manner working regulating device as well.

In one embodiment of the invention a respectively the first regulating system for vibration compensation in at least one degree of freedom in translation Xt, Yt and/or Zt and in at least one degree of freedom in rotation Xr, Yr and/or Zr is provided. I.e. the first regulating system acts or is effective in the mentioned degrees of freedom. Preferably, the first regulating device acts in all three translation degrees of freedom Xt, Yt and Zt and in all three rotation degrees of freedom Xr, Yr and Zr.

In one embodiment the first regulating system is provided by at least the first sensors, the first actuators and a first regulating device which is intended (or embodied or constructed) or suitable to process the provided first sensor signals to form the first actuator actuation signals. The first sensors are suitable for the detection of vibrations in at least one translation degree of freedom Xt, Yt and/or Zt and/or in at least one rotation degree of freedom Xr, Yr and/or Zr. Preferably, the first sensors are sensitive in all three translation degrees of freedom Xt, Yt and Zt and in all three rotation degrees of freedom Xr, Yr and Zr. The first actuators for vibration compensation are suitable for acting in at least one translation degree of freedom Xt, Yt and/or Zt and/or in at least one rotation degree of freedom Xr, Yr and/or Zr. Preferably, the first actuators are suitable for acting in all three translation degrees of freedom Xt, Yt and Zt and in all three rotation degrees of freedom Xr, Yr and Zr.

In a further embodiment of the invention a respectively the second regulating system for vibration compensation in at least one degree of freedom selected from the three degrees of freedom Zt, Xr and/or Yr which are effective in vertical direction is provided. The second regulating system acts or is effective in the aforementioned degrees of freedom. The second regulating system preferably acts in all vertically degrees of freedom Zt, Xr and Yr.

In a preferred embodiment the second regulating system is provided by at least the second sensors, the second actuators and a second regulating device which is intended (or embodied or constructed) or suitable to process the second signals to form the second actuator actuation signals. Since the second actuators are particularly provided by the aforementioned pneumatic vibration isolators, the second regulating system is subsequently described as pneumatic system or subsystem as well.

Also the first regulating system and the second regulating system can be provided in a single regulating system. In such a single regulating system the first and the second regulating system can be provided for instance by means of corresponding routines for data processing and/or by means of corresponding circuits.

Preferably, the vibration compensation is performed in the at least one vertically acting degree of freedom in translation Zt and in the at least two vertically acting degrees of freedom in rotation Xr and Yr by the first regulating system and/or the second regulating system.

In one embodiment at least one branch or connection (or junction) from the first regulating system to the second regulating system is provided.

The branch from the first regulating system to the second regulating system or the combining of the first regulating system with the second regulating system is such that the first regulating system and the second regulating system are coupled to act together in at least one degree of freedom.

Particularly, the first regulating system uses, completely or partially, the acting force of the second regulating system in at least one degree of freedom selected from the vertically effective degrees of freedom Xr, Yr and/or Zt.

In one modification of the invention the first and second actuator actuation signals for vibration compensation, which are effective in the one degree of freedom in vertical translation Zt and the two degrees of freedom in vertical rotation Xr and Yr, are distributed or divided (or split), in particular to provide portion or partitions of the signals. Preferably, the distribution or division is performed in adjustable portions or partitions.

Furthermore, the present invention is characterized in one embodiment that the first and/or the second actuator actuation signals, which are effective in the one degree of freedom in vertical translation Zt and/or in the two degrees of freedom in vertical rotation Xr and Yr, are distributed or divided, particularly in portions, dependent on an amplitude of the vibration to be counteracted and/or dependent on a frequency of the vibration which is to be counteracted. For instance, vibrations of large amplitude require a corresponding large amplitude for vibration compensation. Said large amplitude vibrations are compensated by means of the second actuators, in the present configuration essentially by means of the pneumatic vibration isolators.

In one modification of the invention, compared with the first actuator actuation signals, a low-frequency interval is assigned to the second actuator actuation signals. Preferably, for vibration compensation the actuator actuation signals are provided in a frequency range up to ca. 30 Hz, preferably up to ca. 10 Hz, most preferably up to ca. 5 Hz. For that purpose a high-pass/low-pass-filter-combination is provided or connected between the first regulating system and the second regulating system, so that the first actuator actuation signals of a low frequency interval are fed to the second actuator actuation signals.

In regulating processes every regulating system, which requires an acting force in one of the three vertically effective degrees of freedom, can apply, entirely or partially, the pneumatic subsystem by means of the HP/TP-combination.

In one embodiment of the invention the first sensor signals are, preferably exclusively, processed to form the first actuator actuation signals and/or the first actuator actuation signals are, preferably exclusively, fed to the first actuators.

In an alternative or supplementary embodiment the second sensor signals are, preferably exclusively, processed to form the second actuator actuation signals and/or the second actuator actuation signals are, preferably exclusively, fed to the second actuators.

In a preferred embodiment the first sensors are provided as acceleration sensors and/or the second sensors are provided as lorentz-motors.

In a further embodiment of the invention the first actuator actuation signals, which act or are effective in at least one degree of freedom of the three vertical degrees of freedom Xr, Yr and Zt, are combined with or added to the second actuator actuation signals which are effective or act in the corresponding degree of freedom Xr, Yr and Zt. For instance, the first actuator actuation signal, which is effective in the degree of freedom Zt, is combined with the second actuator actuation signal, which is effective in Zt as well.

Another embodiment of the invention is characterized such that the first actuator actuation signals are frequency-dependent filtered and filtered first actuator actuation signals of a low-frequency interval are fed to the second actuators and filtered first actuator actuation signals of a higher-frequency interval are fed to the first actuators.

Generally the invention is described by vibration isolation systems with pneumatic isolators wherein the pneumatic isolators are intended to be used not only for position bearing but for vibration or force compensation as well. The application of the pneumatic system as an additional force-actuator-system enables the possibility to generate larger forces for compensation. Additionally, waste heat, for instance caused by high currents of the lorentz-motors, which act often as first actuators, can be reduced.

The controlling or regulating principle of the invention essentially bases on operating the pneumatic system, in particular in analogy to the regulating of the residual regulating systems, as for instance the first regulating system, by means of a "sensor-input-steering-matrix" and/or an "actuator-output-steering-matrix". These matrices calculate or projects the single sensor signals and the single actuator signals respectively to the axes of the degrees of freedom.

This configuration enables the possibility to apply each actively controlled pneumatic isolators in a vibration isolation system. A preferred embodiment of the invention is characterized such that four actively controlled or controllable pneumatic isolators are operated. In the state of the art three actively controlled pneumatic isolators are operated only.

Preferably, all isolators of the system, which particularly each comprises a controllable valve system, are applied in the controlling. For example, a system with four isolators can be operated with four controllable valves and not only with three controllable valves. Since the redundancy causes no problems in the controlling.

In a specific embodiment of the invention a vibration isolation system is applied wherein the pneumatic subsystem is formed by four isolators each having an associated actively controllable valve. The pneumatic subsystem is addressed and controlled in the degrees of freedom in which the subsystem is effective. Thereby, the controlling can use the acting force potential of the pneumatic isolators in such a way that, by means of circuits and/or routines according to the invention, the different controlling subsystems, as for instance the first regulating system, transfer their actuation signals, at least partially, to the pneumatic subsystem, exemplary embodied as the second regulating system. According to one modification of the invention it is possible that in the regulating process every regulating system, which requires an acting force in one of the three vertically effective degrees of freedom, can use, entirely or partially, the pneumatic subsystem, in particular by means of a high-pass/low-pass-combination (HP/TP-combination).

Each kind of regulating (or controlling) needs to receive information or data enabling the motion determination of the isolated assembly, the calculation and/or provision of a kind of countermovement to remain the assembly in rest or to restore the assembly in an essentially motion-free or motion-reduced or oscillation-reduced state.

In one embodiment of the invention the controlling, in particular of the first and/or the second regulating system, bases on a so-called feedback controlling. In the feedback controlling the controlling needs to receive sensor signals, which are proportional to the motion, in particular to the acceleration, of the isolated body. The sensor signals are used in the controlling system or in the controlling device to generate compensation signals. The compensation signals are used to control the actuators, for instance to isolate a body from am moving floor or to generally reduce the motions of the body. The controlling system or controlling device processes the sensor signals to form or to calculate the compensation signals to control the actuators.

An alternative or supplementary embodiment of the invention bases on a controlling, in particular of the first and the second controlling system, called feedforward controlling. In feedforward controlling the controlling needs to receive sensor signals, which enable the controlling to conclude or to calculate the acceleration. The forces which are or will be induced by the motion of the components are anticipated.

This example is illustrated by means of the stage. A stage movement influences the entire state of the system. These influences can be described by a transmission function for vibrations or by a transmission characteristics in the system. A corresponding transmission function exists for each stage movement and/or each stage position on the support body. The transmission function is stored in advance and therefore can be provided in an appropriate situation.

In system operation the stage sends status movement data and/or status position data to the feedforward controlling. The feedforward controlling folds the received data with the corresponding transmission function. The folding result is sent (by the feedforward controlling) as an actuator actuation signal to the actuators. In this manner the actuators are prepared to minimize the influence of the stage motion to the system vibration state. Accordingly, in this manner the forces which will be induced by the stage are anticipated. This enables a fast controlling to remain or to restore the assembly in an oscillation-reduced state.

BRIEF DESCRIPTION OF THE DRAWINGS

The invention is explained subsequently in more detail on the basis of preferred embodiments and with reference to the appended figures. The features of the different embodiments are able to be combined with one another. Identical reference numerals in the figures denote identical or similar parts.

DETAILED DESCRIPTION OF THE INVENTION

Figure 1:
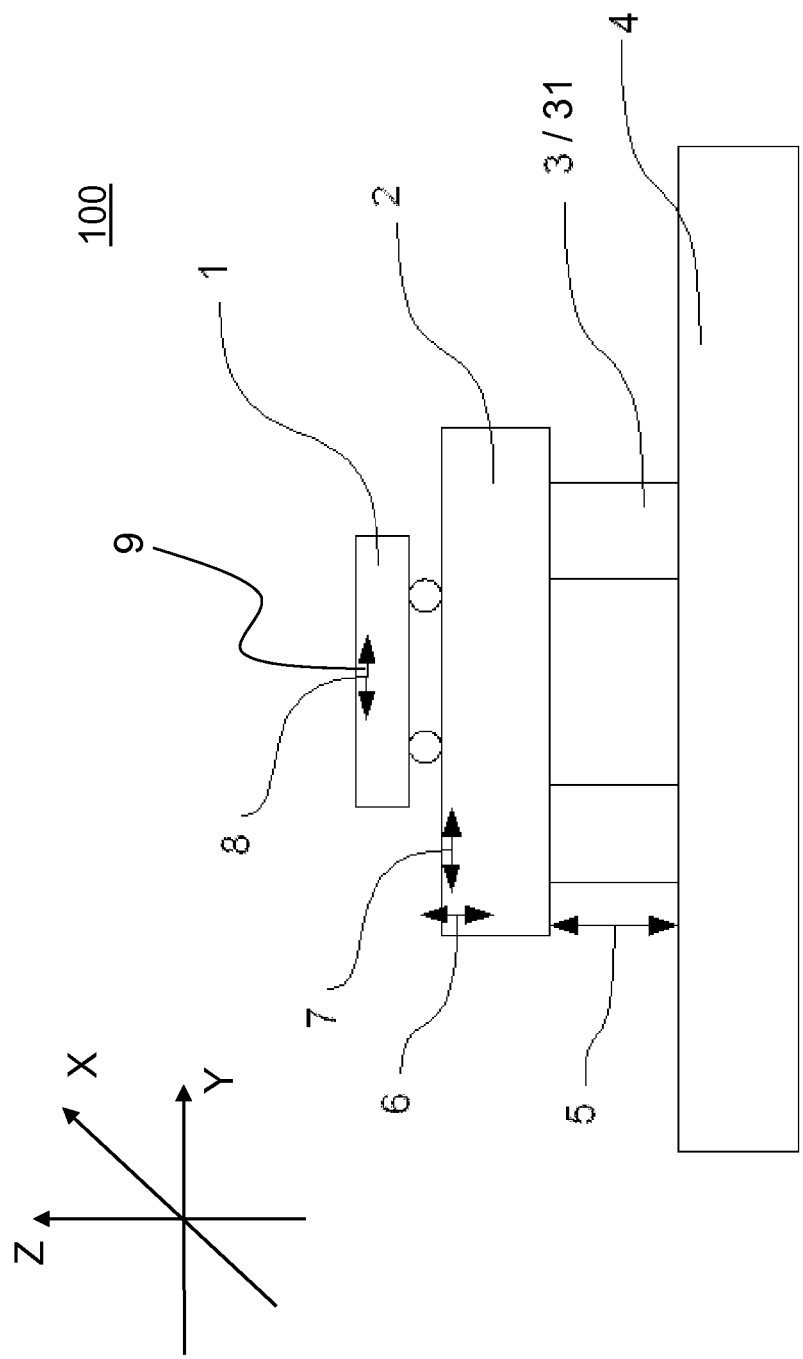
FIG. 1 schematically shows an example of an active vibration isolation system.

FIG. 1 shows a vibration isolation system 100 based on pneumatic isolators 3. A body 2 which is to be isolated is carried or borne by means of pneumatic isolators 3 and is therefore isolated from vibrators or isolated from a floor 4. A movable table 1, in particular for the transportation of wafers, lithography-devices, waver-handling-systems and/or microscopes, is positioned upon the body 2.

For active vibration isolation the system 100 comprises in one embodiment four pneumatic isolators 3, a plurality of actors and a plurality of sensors 5, 6, 7, 8 and 9 as vibration signal transducers. By means of the sensors 6, 7, 8 and 9 vibrations or generally motions of the support body 2 and the load 1 which is to be isolated can be detected, processed into signals and transferred to a controlling or regulating system, as for instance the first regulating 10. Accordingly, the sensors 5, 6, 7, 8 and 9, acting as vibration signal transducers, provide sensor signals which represent vibrations.

To achieve an improved overview, the components are shown only partially and beyond that, beside the isolator 3 and the valves 31, no further force actuators are shown. In the shown example the sensors are presented for two degrees of freedom in translation Yt and Zt only.

For example, the sensors are velocity sensors, acceleration sensors and/or position sensors. As one example a position sensor 5 and one velocity sensor and/or acceleration sensor being sensitive in vertical direction 6 and in horizontal direction 7 as well one acceleration sensor 8, which is positioned at movable table 1, and a position sensor 9 are illustrated only.

Preferably, the actuators are actuators with horizontal and/or vertical acting direction. In general, the actuators are conventional force actuators. Examples for the force actuators or actuators represent Lorentz-motors and/or piezo-actuators etc. In general, the actuators are positioned in spatial proximity to the sensors. In one embodiment one actuator is assigned to each sensor.

The pneumatic isolators 3 are, in particularly each, a equipped with a, preferably electronically, controllable valve 31. A pneumatic isolator 3 together with the valve 31 forms an actuator with vertical acting direction or an actuator which is effective in vertical direction.

The horizontal direction or plane is illustrated by the axes X and Y and the vertical direction is illustrated by the axis Z of the coordinate system shown in FIG. 1. The axes X and Z are in the plane of projection and the axis Y is perpendicular to said plane of projection.

The sensors 5, 6, 7, 8 and 9 provide entrance or input signals, as for instance first and second sensor signals, for the regulating systems 10 and 20, in particularly the regulating device 12 and 22. Preferably the input signals can be velocity signals, acceleration signals and/or position signals.

In one regulating system or in one regulating device the sensor signals are processed in a specific way to form actuator actuation signals. The processing is such that the vibration of a carried body 2 is reduced or even minimized, even in case the movable table 1 (so-called stages 1) is travelling on the body 2.

According to the invention the regulating system uses in a particular and general way the pneumatic actuators 3, 31 as, preferably additional, force actuators. They are used in such a way that redundancy causes no or essentially no regulating instabilities. Since to the four independently working (or operating) regulation loops for the valves 31 would induce a building-up process in the system due to the redundancy in the system.

For the purpose that parallel operating regulating systems, as for instance the first regulating system 10, can profit from acting forces of the pneumatic isolators 31 as well, a new structuring of the regulation of the pneumatic subsystem, as the second regulating system 20, is designed, in particular both to avoid controlling instabilities and to achieve acting force (or dynamic effect) as good as possible.

For that purpose now, in analogy to the structuring of the generally numerically redundant force actuators in the regulating system, as for instance the first regulating system 10, also a steering-matrix is introduced in the pneumatic regulating system as the second regulating system 20.

Figure 2:
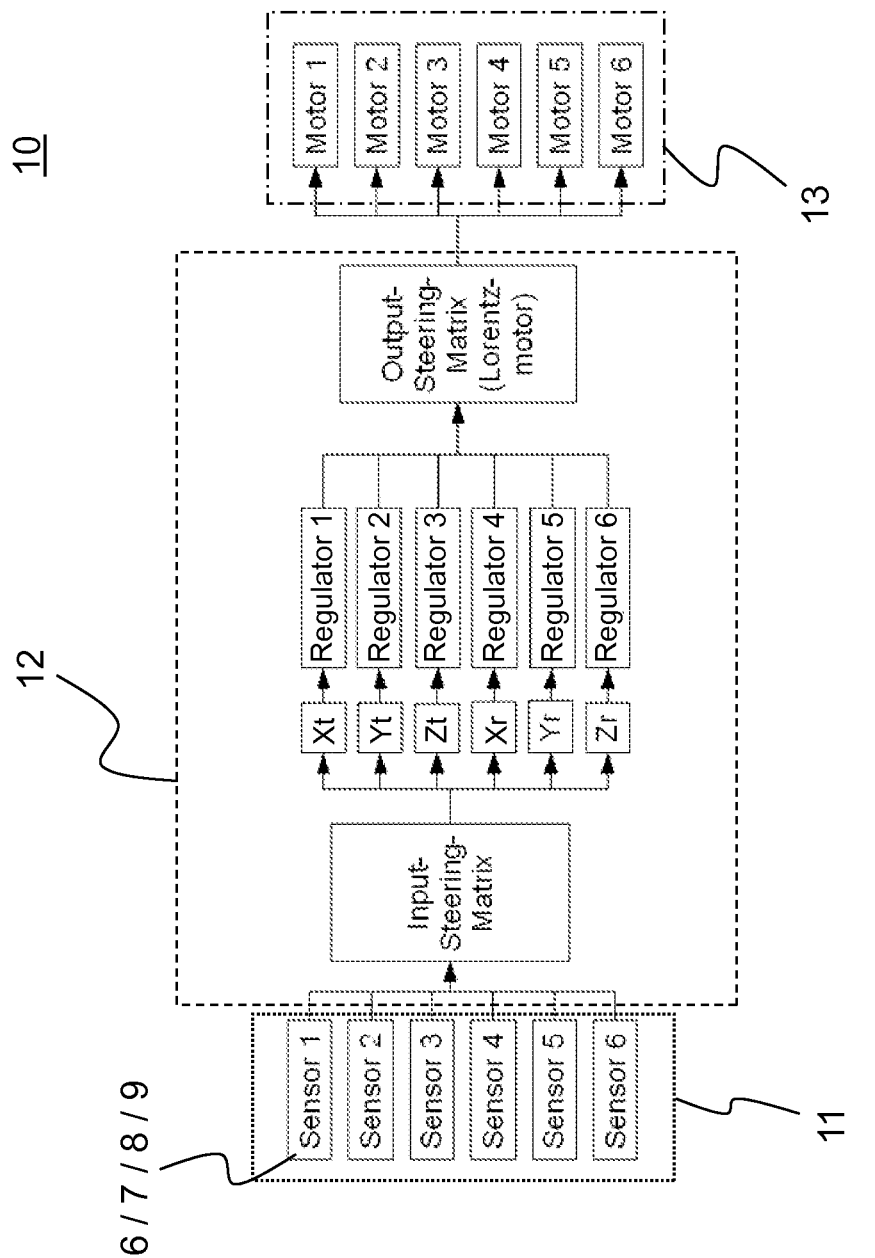
FIG. 2 schematically shows an exemplary regulating system having a plurality of sensors, steering-matrices and a plurality of motors.

FIG. 2 illustrates a first regulating system 10 with first sensors 11, a first regulating device 12 and first actuators 13. As an example the sensors 1 to 6 are shown. They are assigned to the support body 2 and/or to the table 1. They detect the vibrations of the support body 2 and/or of the table 1. Preferably the vibrations in the three degrees of freedom in translation Xt, Yt and Zt as well in the three degrees of freedom in rotation Xr, Yr and Zr are detected.

In general the first sensors 11 are arranged at different positions so that the entire or total movement or all directions in space can be observed. The first sensors 11 can be effective in one degree of freedom only or in several degrees of freedom as well. In case that the sensors are effective only in one direction in space, all directions in space can be detected by a corresponding spatial orientation of the sensors and by a vectorial addition of the detected "forces".

To determine the motion or vibration of the body 2 and also the required compensation, the signals of the first sensors 11, i.e. the first sensor signals 11, are combined (or brought together) and, for instance in dependency on their position and/or their detection orientation and/or further sensor features, together processed in the first regulating device 12. In one example the processing or calculation is performed by means of a computer. The first regulating device 12 is embodied to process the provided first sensor signals to form the first actuator actuation signals.

This occurs in so-called steering-matrices, in detail in an input-steering-matrix and in an output-steering-matrix. The input-steering matrix transforms (or processes) the first sensor signals to motion data, as for instance motion data of the support body 2 and/or of the table 1. The input-steering-matrix contains information or a processing construction how the individual first sensor signals must be processed with one another to determine a complete motion, in particular of the support body 2, or a disturbing motion, preferably in all of the six degrees of freedom Xt, Yt and Zt and Xr, Yr and Zr.

The determined components Xt, Yt and Zt as well as Xr, Yr and Zr are provided or fed to the controller (closed loop) 1 to 6. There, the corresponding compensation signals are calculated. The compensation signals can be named also as correction signals. These compensation signals are, preferably indirectly or by means of the subsequently described output-steering-matrix, transmitted to the first actuators 13 for counteracting the vibrations. Motors 1 to 6 are shown as one example. They are assigned to the support body 2 and/or the table 1. The vibrations, particularly of the support body 2, are reduced or compensated. Preferably, the vibrations in the three degrees of freedom in translation Xt, Yt and Zt as well as the three degrees of freedom in rotation Xt, Yr and Zr are compensated.

Generally the actuators are arranged at different positions to compensate the entire mass motion or to compensate the motion in all directions in space. The actuators themselves can act or be effective in only one degree of freedom or in several degrees of freedom. In case the actuators are effective in one direction in space only, by means of a corresponding spatial orientation of the actuators and a vectorial addition of the actuator force directions all direction in space can be covered.

To achieve the required compensation, the actions or the countermovement of the individual actuators need to be adjusted or matched to one another. Therefore, the first compensation signals are combined or joint and commonly processed, for instance as a function of the position and/or the acting direction and/or further features of the actuators, and the true first actuator actuation signals are determined.

This occurs in an output-steering-matrix. The output-steering-matrix contains information or a processing instruction how the individual first compensation signals, preferably determined for the each degree of freedom, need to be distributed to the individual actuators to enable a compensation of the entire movement or the compensation of a disturbing vibration, particularly of the support body 2, preferably in all six degrees of freedom Xt, Yt and Zt and Xr, Yr and Zr. For instance, in the output-steering-matrix the positions and/or the acting direction of the actuators 13 and further actuator features are taken into account.

The first regulating system 10 bases for instance on at least one sensor-actuator-combination selected from a group consisting of position-sensor-input to lorentz-motor-output (so-called "proximity-force-loop"), geophone-input to lorentz-motor-output (so-called "velocity-loop"), acceleration-input to lorentz-motor-output (so-called "acceleration-loop"), stage-position and acceleration input to lorentz-motor-output (so-called "stage-feedfoward"), floor sensor to lorentz-motor-output (so-called "floor-feedforward"). The first regulating device 10 works or acts on the "logical axes" of the six degrees of freedom.

According to the present invention there is not only the application of pneumatic isolators 3 in combination with further force actuators for the generation of additional compensation forces only. Generally the combination occurs in the same actuator-plane. One example represents the so-called "mixing" of a lorentz-motor with a pneumatic isolator 3 and valve 31 as a regulating concept for a position actuator. The invention is in contrary and relies on the application of pneumatic isolators 3 in combination with further force actuators for the generation of, particularly additional or proportional, compensation forces on regulating level. The principle of the regulating or controlling according to the invention bases on operating the pneumatic system 20 in analogy to the regulating of the first regulating system 10, and further optional regulating systems, by means of an input-steering-matrix and an output-steering-matrix. They are also called as sensor-input-steering-matrix and as actuator-output-steering-matrix respectively.

Figure 3:
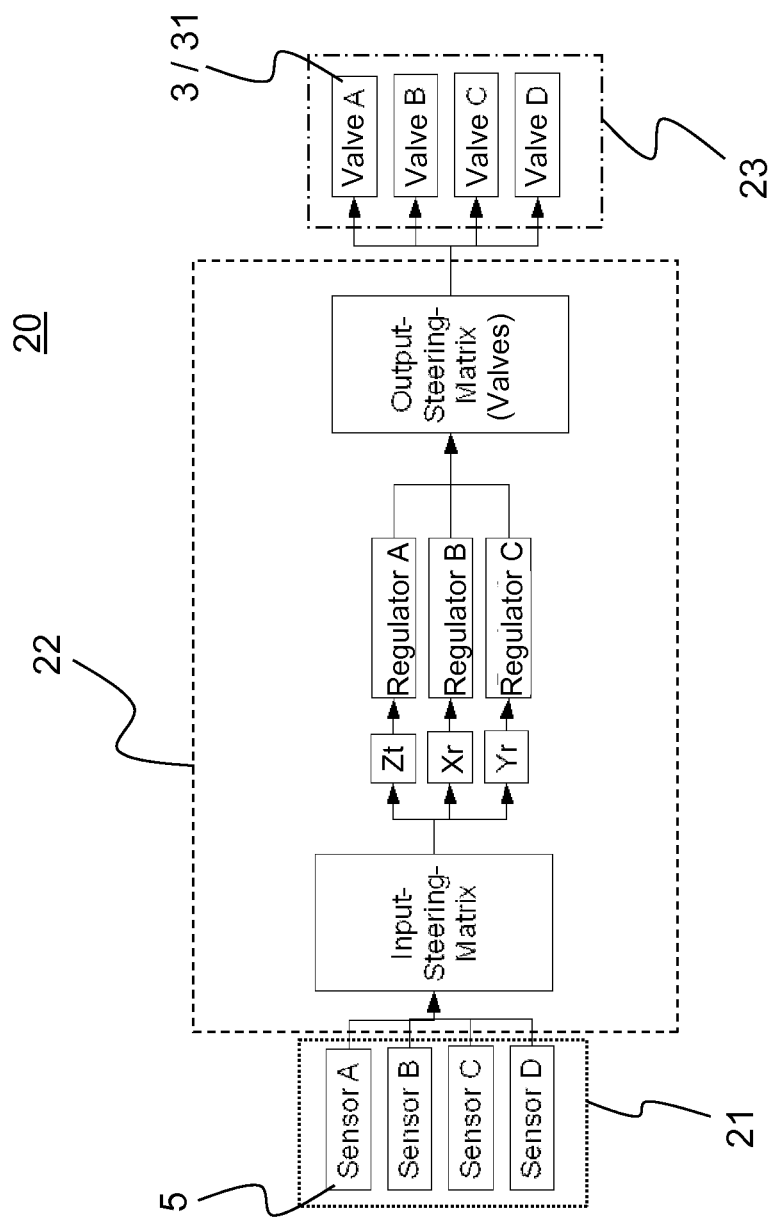
FIG. 3 schematically shows an exemplary controlling in a pneumatic subsystem with steering-matrices.

For this FIG. 3 shows a pneumatic sub-system 20 with the steering-matrices as the second regulating system 20. The second regulating system 20 comprises second sensors 21, a second regulating device 22 and second actuators 23. The regulating principle is in accordance to the regulating principle shown in FIG. 2. However, in contrast to this the sensors 1 to 6 are replaced by the sensors A to D. The sensors A to D represent the position sensors of the isolators 3. As a further difference the motors 1 to 6 are replaced by controllable valves 31 of the isolators 3, wherein each isolator 3 together or in combination with a valve 31 act as a second actuator 23.

Due to the merely vertical "nature" of the pneumatic actuators 3 and 31, this results in three degrees of freedom where the actuators 3 and 31 are effective: $Z_{translation}$ (Zt), $X_{rotation}$ (Xt) and $Y_{rotation}$ (Yr). Accordingly, the second pneumatic regulating system 20 acts or is effective in the three vertical degrees of freedom Zt, Xr and Yr. A translational motion Zt corresponds to a motion along the axis Z, i.e. along the vertical line. It represents a change in the height position of the support body 2. A rotational motion Xr and/or Yr represents a rotation around the axes X and/or Y. The axes X and Y form the horizontal plane. It represents a kind of "tilting" or "twisting" of the support body 2 in or out of the horizontal plane.

According to the present invention the height controlling of the system is not yet operated by means of the position- (height-)sensor and an assigned isolator (so-called co-located controlling). A co-located controlling line is provided, if each actuator and sensor act as a regulating line and if they are arranged in spatial proximity. The height regulating according to the invention is performed by an input-steering-matrix. The input-steering-matrix converts or projects (by means of calculation) the position sensor signals to the three degrees of freedom Zt, Xr and Yr. Three independent control-loop-regulations provide their output-signals to the pneumatic actuator axes Zt, Xr and Yr. For the pneumatic height regulating the nominal value of the regulation in Xr and Yr is equal to zero and the nominal value of the regulation in Zt corresponds to the height. Since now "only" three controlling loops are in operation, there is no redundancy. A controlling instability is not expected.

The first regulating system 10 operates on the axes of the six degrees of freedom. I.e. The first regulating system 10 acts on the three translation degrees of freedom as well on the three rotation degrees of freedom. Accordingly, a disturbing vibration can be counteracted in each motion degree of freedom. In an ideal case the vibration is compensated. In a simple manner it is possible that the second regulating system 20 co-acts or even acts alone in at least one degree of freedom selected from the three vertically effective degrees of freedom Zt, Xr and Yr or in all three vertically effective degrees of freedom Zt, Xr and Yr. Accordingly, the pneumatic sub-system 20 acts as an actuator system.

Thereby, it is possible to realize from each individual regulating system, as in the present configuration the first regulating system 10, a connection or branch to the pneumatic sub-system 20. The output signals, i.e. the actuator actuation signals of the regulating system, of the degrees of freedom Zt, Xr and Yr are divided or distributed in, preferably adjustable, ratios or fractions. A first fraction of the output signals are transferred to the "traditional" actuator-output-steering-matrix of the first regulating system 10, for instance for controlling the lorentz-motors. A second fraction of the output signals are transferred to the actuator-output-steering-matrix of the pneumatic sub-system 20. Possible embodiments are presented in the subsequently described FIGS. 4 and 5.

The first regulating system 10 and the second regulating system 20 and further optional regulating systems are coupled or combined with each other.

Figure 4:
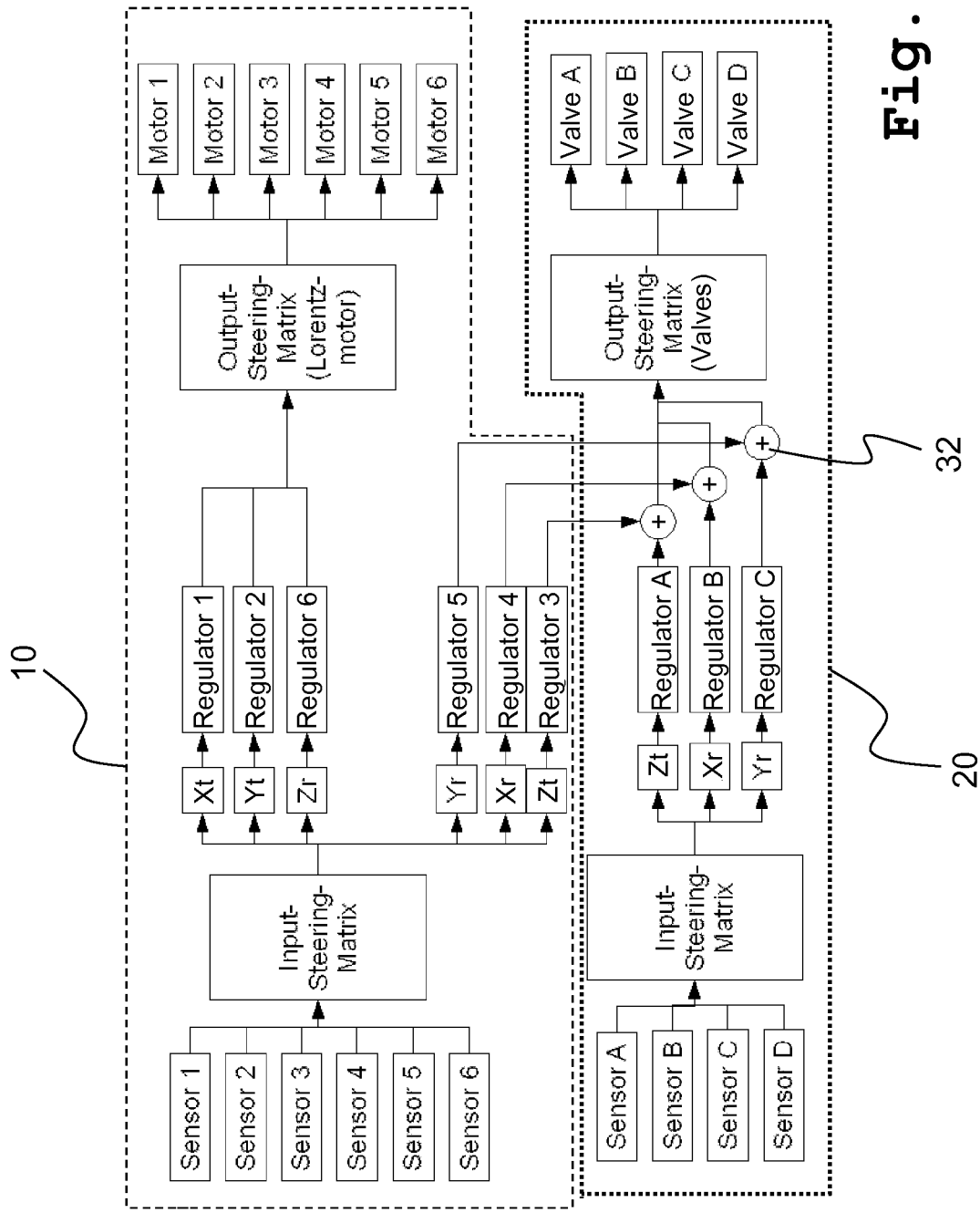
FIG. 4 schematically shows a first exemplary coupling of a regulating system with the regulation in a pneumatic subsystem.

At first, FIG. 4 presents an exemplary coupling of the regulating system 10 illustrated in FIG. 2 with the regulating in the pneumatic sub-system 20 as the second regulating system illustrated in FIG. 3. All actuator actuation signals in the degrees of freedom Xr, Yr and Zt are processed by means of the pneumatic, i.e. by means of the pneumatic sub-system 20.

The output signals of the regulators 3, 4 and 5 of the first regulating system 10 are not fed as first actuator actuation signals to the first actuators 13. Said output signals are fed (or transferred) to the second pneumatic regulating system 20.

The output signals of the regulators 3, 4 and 5 are fed (or "added") to or combined with the output signals of the regulators A, B and C in the second pneumatic regulating system 20. Means for combining 32 are intended for this feeding. For instance, the means for combining 32 are embodied or constructed as a, preferably digital, circuit, and/or as a computer routine. The combining process is carried out in dependency on the degree of freedom: For instance, the output signal of the regulator 3, which contains the information in Zt, is fed to the output signal of the regulator A, which contains the information in Zt as well. The corresponding feeding is also valid for Xr in the combination of regulator 4 with regulator B and for Yr in the combination of regulator 5 with regulator C.

The combined or added (or formed) output signals now contain the information in Xr, Yr and Zt by means of the information, i.e. the height position of the support body 2, detected by the second sensors 21, presently embodied as position sensors 5, and the information, i.e. the vibration of the support body 2 and/or the table 1, detected by the first sensors 11, presently embodied as acceleration sensors and/or as velocity sensors and/or as position sensors. The output signals of the regulators 3, 4 and 5 and the output signals of the regulators A, B and C are combined to form the input or input signals for the output-steering-matrix. The combined output signals are fed to the output-steering-matrix. The output-steering-matrix calculates or generates the "real" second actuator actuation signals. The respective second actuator actuation signals for the individual second pneumatic actuators 23, 3, and 31 (A, B, C and D) are calculated or generated. In a next step the second actuator actuation signals are fed to the second actuators A, B, C and D for vibration and/or position compensation in the degrees of freedom or axes Xr, Yr and Zt.

On the other hand the output signals of the regulators 1, 2 and 6 of the first regulating system 10 for Xt, Yt and Zr are fed to the first actuators 13 by means of the output-steering-matrix.

According to the invention the dividing or distributing of the signals is performed in, preferably adjustable, portions or fractions. The dividing occurs not only with respect to the amplitude. The dividing occurs, as an alternative or as a supplement, with respect to the frequency of the actuator actuation signals as well. Therefore, a high-pass-/low-pass-filter-combination 33 is provided. By means of the high-pass (HP) and the low-pass (TP) the actuator signals of the first regulating loop 10 are distributed to the first actuators 13, for instance lorentz-motors, of the first regulating system 10 and to the second actuators 23 of the second pneumatic sub-system 20. Preferably the low-frequency actuator actuation signals are processed by the pneumatic sub-system 20 and the, compared with these signals, higher-frequency actuator actuation signals are processed by the "standard actuators" of the first regulating system 10. Accordingly, in such a configuration the limited band width of the pneumatic regulation 20 is taken into account. The pneumatic system 20 is able to regulate adequately particularly preferred up to ca. 30 Hz or preferred up to ca. 10 Hz or up to 5 Hz.

Figure 5:
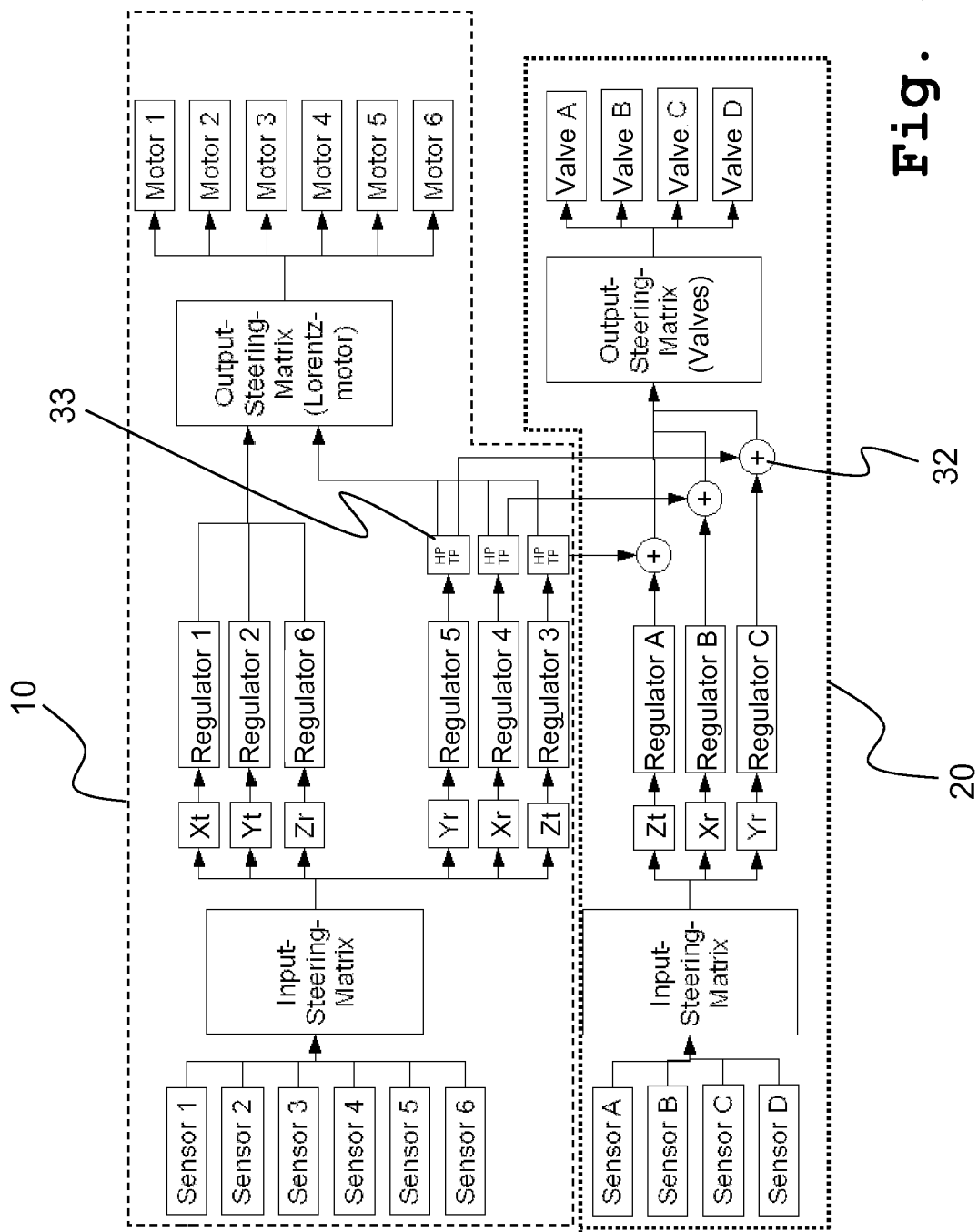
FIG. 5 schematically shows a further exemplary coupling according to the invention of a regulating system with the regulation in a pneumatic subsystem.

For that purpose FIG. 5 shows an exemplary coupling of the first regulating system 10 with the regulating in the pneumatic sub-system 20 being the second regulating system 20 by using a high-pass-/low-pass-filter-combination 33. It is referred to the description of FIG. 4 for similar or identical components. In the present embodiment, and as a difference to the embodiment shown in FIG. 4, the output signals of the regulators 3, 4 and 5 are not exclusively fed to the second regulating system 20. They are fed to the second regulating system 20 by parts only. For that purpose a high-pass-filter (HP) and a low-pass-filter (TP) 33 are provided before the means for connecting 32. First, the output signals of the regulators 3, 4 and 5 are fed to high-pass-/low-pass-filter-combination 33. Output signals having a lower frequency are fed to the second regulating system 20. Output signals having a higher frequency remain in the first regulating system 10. These signals are fed as first actuator actuation signals to the first actuators 13, presently embodied as the motors 1, 2, 3, 4, 5 and 6. Accordingly, a first fraction of the output signals of the first regulating system 10 are fed to the first actuators 13 of the first regulating system 10. A second fraction of the output signals of the first regulating system 10 are combined with the output signals of the second regulating system 20 to form the second actuator actuation signals. These second actuator actuation signals are fed to the actuators 23 of the second regulating system 20. In the regulating process every regulating system, which requires an acting force in one of the three vertically effective degrees of freedom, can use, entirely or partially, the pneumatic sub-system 20 by means of the HP/TP-combination 33.

In one embodiment of the regulating system 10 as a "stage-feedforward", which is not illustrated in the figures, it is also possible to perform a separating (or dividing) according to the input signals, in particular instead of the afore mentioned frequency separating. In a common "stage-feedforward-regulation" the feedforward-controlling relates to the movable tables 1, the so-called "stages" 1 which are positioned upon the isolated bearing body 2. The acceleration signals and the position signals of the stage 1 are processed by means of a controlling and fed to the force actuators, for instance lorentz-actuators, in such a way that the effect of the generated force to the bearing body 2 is minimized. According to one embodiment of the invention the pneumatic 3 and 31 is able to act as actuators for the position signals whereas the acceleration signals remain for the lorentz-motors. In particular with respect to the stage 1, there exist a huge potential to reduce the waste heat of the lorentz-motors. In such a configuration the acting force to carry the load of the movable table 1 is provided essentially or only by the pneumatic, instead of supplying a constant current to the lorentz-motors.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, features of the above described specific embodiments can be combined with one another. Further, features described in the summary of the invention can be combined with one another. Furthermore, features of the above described specific embodiments and features described in the summary of the invention can be combined with one another.

REFERENCE LIST

1 Movable or travelling table or stage or load
2 Isolated body or base element or isolated table or main plate or support body
3 Pneumatic isolator or vibration (or oscillation) isolator or air bearing
4 Base or floor or frame
5 Position sensor
6 Velocity sensor or acceleration sensor in vertical direction
7 Velocity sensor or acceleration sensor in horizontal direction
8 Velocity sensor or acceleration sensor in horizontal direction
9 Position sensor
10 First regulating system or first controlling system
11 First sensors
12 First regulating device or first controlling device
13 First actuators
20 Second regulating system or second controlling system
21 Second sensors
22 Second regulating device or second controlling device
23 Second actuators
31 Valve of a pneumatic isolator 3
32 Means for combining or adding
33 High-pass-/low-pass-filter-combination
100 vibration or oscillation isolation system

What is claimed is:
1. An active vibration isolation system comprising:
a) a support body for bearing a load that is to be isolated;
b) pneumatic vibration isolators with controllable valves for carrying the support body with respect to a base;
c) position sensors for providing vertical position signals of the support body;
d) a first regulating system for vibration compensation in at least one degree of freedom in translation (Xt,Yt,Zt) and in at least one degree of freedom in rotation (Xr,Yr,Zr) with at least
d1) first sensors for providing first sensor signals that represent vibrations,
d2) first actuators for vibration compensation that are controllable by feeding first actuator actuation signals, and d3) a first regulating device for processing the provided first sensor signals to form the first actuator actuation signals; and e) a second pneumatic regulating system for vibration compensation in at least one degree of freedom selected from three degrees of freedom (Zt,Xr,Yr) that are effective in vertical direction with at least e1) the position sensors as second sensors for providing second sensor signals that represent vibrations, e2) the pneumatic vibration isolators with the valves as second actuators for vibration compensation that are controllable by feeding second actuator actuation signals, and e3) a second regulating device for processing the provided position signals to form the second actuator actuation signals;

wherein at least one branch from the first regulating system to the second pneumatic regulating system is provided such that the first regulating system and the second pneumatic regulating system are coupled to act together in at least one degree of freedom of the three degrees of freedom (Zt,Xr,Yr) that are effective in vertical direction.

2. The active vibration isolation system according to claim 1, characterized by means for combining the first actuator actuation signals which are effective in at least one degree of freedom of the three vertical degrees of freedom (Zt,Xr,Yr) with the second actuator actuation signals which are effective in the corresponding degree of freedom.

3. The active vibration isolation system according to claim 1, wherein a high-pass/low-pass-filter-combination is provided between the first regulating system and the second regulating system, so that the first actuator actuation signals of a low frequency interval are fed to the second actuator actuation signals.

4. A method for regulating an active vibration isolation system that is equipped with a support body for bearing a load that is to be isolated, comprising:

detecting, by a plurality of first sensors, at least vibrations of the support body and the load that is to be isolated, resulting in first sensor signals that represent the detected vibrations;

detecting, by a plurality of position sensors as second sensors, vertical positions of the support body, resulting in second sensor signals that represent the detected vertical positions;

processing, by a first regulating device, the first sensor signals to form first actuator actuation signals for controlling first actuators;

processing, by a second regulating device, the second sensor signals to form second actuator actuation signals for controlling second actuators that are provided as pneumatic vibration isolators that carry the support body with respect to a base; and feeding, by the first and second regulating devices, respectively, i) the first actuator actuation signals to the first actuators and ii) the second actuator actuation signals to the second actuators, to counteract the vibrations.

5. The method according to claim 4, further comprising providing a first regulating system for vibration compensation in at least one degree of freedom in translation (Xt,Yt,Zt) and in at least one degree of freedom in rotation) (Xr,Yr,Zr).

6. The method according to claim 5, wherein the first regulating system comprises the first sensors, the first actuators and the first regulating device.

7. The method according to claim 5, further comprising providing a second regulating system for vibration compensation in at least one degree of freedom selected from three degrees of freedom (Zt,Xr,Yr) that are effective in vertical direction.

8. The method according to claim 7, wherein the second regulating system comprises the second sensors, the second actuators and the second regulating device.

9. The method according to claim 7, further comprising providing at least one branch from the first regulating system to the second regulating system.

10. The method according to claim 4, wherein vibration compensation is performed in at least one vertically acting degree of freedom in translation (Zt) and in at least two vertically acting degrees of freedom in rotation (Xr,Yr) by at least one of a first regulating system or a second regulating system.

11. The method according to claim 4, wherein at least one of the first and second actuator actuation signals, which are effective in one degree of freedom in vertical translation (Zt) and in two degrees of freedom in vertical rotation (Xr,Yr), respectively, are distributed dependent on at least one of an amplitude of the vibration to be counteracted and a frequency of the vibration to be counteracted.

12. The method according to claim 4, wherein, compared with the first actuator actuation signals, a low-frequency interval is assigned to the second actuator actuation signals.

13. The method according to claim 4, further comprising combining the first actuator actuation signals with the second actuator actuation signals, wherein the first actuator actuation signals are effective in at least one degree of freedom of three vertical degrees of freedom (Xr,Yr,Zt), and wherein the second actuator actuation signals are effective (act) in the corresponding degree of freedom (Xr,Yr,Zt).

14. The method according to claim 4, wherein the first actuator actuation signals are frequency-dependent filtered and filtered first actuator actuation signals of a low-frequent interval are fed to the second actuators and filtered first actuator actuation signals of a higher-frequent interval are fed to the first actuators.

* * * * *